United States Patent [19]

Miyatake et al.

[11] Patent Number: 4,591,313
[45] Date of Patent: May 27, 1986

[54] PROPELLER PITCH CONTROL SYSTEM AND APPARATUS

[75] Inventors: Henry J. Miyatake, Bellevue; Seiya Sakurai, Seattle, both of Wash.

[73] Assignee: The Boeing Company, Seattle, Wash.

[21] Appl. No.: 567,054

[22] Filed: Dec. 30, 1983

[51] Int. Cl.[4] ............................................. B64C 11/44
[52] U.S. Cl. .................................. 416/155; 416/165; 74/89.15
[58] Field of Search ............................. 416/155, 165; 74/424.8 R, 424.8 B, 424.8 C, 441, 89.15

[56] References Cited

U.S. PATENT DOCUMENTS

| | | | |
|---|---|---|---|
| 1,374,786 | 4/1921 | Walker | 416/155 |
| 1,879,142 | 9/1932 | Egan . | |
| 2,236,841 | 4/1941 | Waseige . | |
| 2,382,460 | 8/1945 | Young | 244/7 |
| 2,394,299 | 2/1946 | Friedrich . | |
| 2,455,239 | 11/1948 | Doussain . | |
| 2,462,182 | 2/1949 | Guerdan et al. | 172/36 |
| 2,548,045 | 4/1951 | Nichols | 416/155 |
| 2,683,379 | 7/1954 | Strandgren | 74/424.8 |
| 2,696,268 | 12/1954 | Marchant . | |
| 2,804,154 | 8/1957 | Treseder et al. . | |
| 2,931,928 | 4/1960 | Fehn, Sr. | 310/95 |
| 2,966,077 | 12/1970 | Wise | 74/424.8 NA |
| 3,187,189 | 6/1965 | Lang | 290/40 |
| 3,187,190 | 6/1965 | Lang | 290/40 |
| 3,583,254 | 6/1971 | Winders | 74/424.8 R |
| 3,691,858 | 9/1972 | Wilke | 74/89.15 |
| 3,705,775 | 12/1972 | Rioux | 417/411 |
| 3,860,064 | 1/1975 | Murphy | 165/121 |
| 3,900,274 | 8/1975 | Johnston | 416/165 X |
| 3,997,131 | 12/1976 | Kling | 244/23 |
| 4,019,616 | 4/1977 | Thorne | 74/424.8 R X |
| 4,033,194 | 7/1977 | Stanley | 74/89.15 |
| 4,044,622 | 8/1977 | Matthews | 74/424.8 R |
| 4,046,241 | 9/1977 | Furtah | 74/424.8 R |
| 4,136,571 | 1/1979 | Frölichsthal | 74/89.15 |
| 4,179,944 | 12/1979 | Conner | 74/89.15 |
| 4,227,860 | 10/1980 | Humphreys | 416/155 |
| 4,232,562 | 11/1980 | Perkins | 74/424.8 R |

FOREIGN PATENT DOCUMENTS

| | | | |
|---|---|---|---|
| 798233 | 5/1936 | France | 416/155 |
| 997446 | 1/1952 | France | 416/155 |
| 1013848 | 8/1952 | France | 416/155 |
| 350257 | 7/1937 | Italy | 416/155 |
| 30517 | 3/1979 | Japan | 416/155 |
| 2091375 | 7/1982 | United Kingdom | 74/424.8 C |

OTHER PUBLICATIONS

Translor, catalogue, by: La Technique Integrale.

*Primary Examiner*—Everette A. Powell, Jr.
*Attorney, Agent, or Firm*—Bruce A. Kaser

[57] ABSTRACT

A plurality of propeller blades are mounted to an axially elongated tubular propeller hub (H1). Each blade is rotatable in position about a radial axis. An electromechanical linear actuator (A1) is housed within the hub for rotating the blades to change their pitch. The actuator includes a rod member (R1) fixed in position relative to the hub, a casing (C1) which can extend and retract relative to the rod member, a rotary electric motor (M1), and a planetary screw drive (SD1). The screw drive (SD1) drivingly interconnects the electric motor (M1) with the casing (C1) for causing the casing to move axially in response to operation of the motor. The actuator (A1) is connected to the propeller (P1) by a linkage (L1) so that movement of the casing causes the propellers to change their pitch. A second actuator (A2) may be housed within the hub (H1) and connected to the first actuator (A1) for providing redundancy in the event of failure of the first actuator.

30 Claims, 11 Drawing Figures

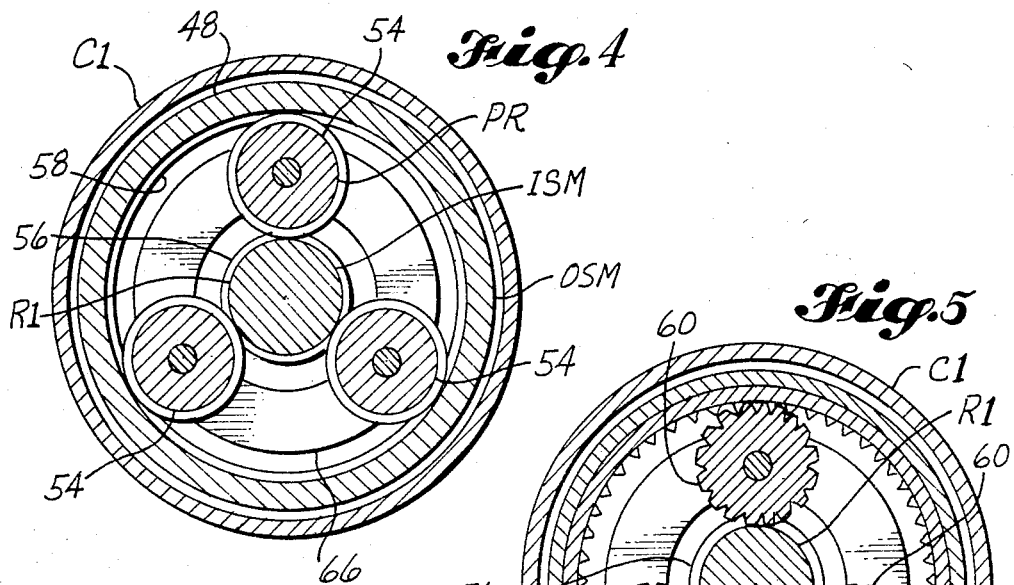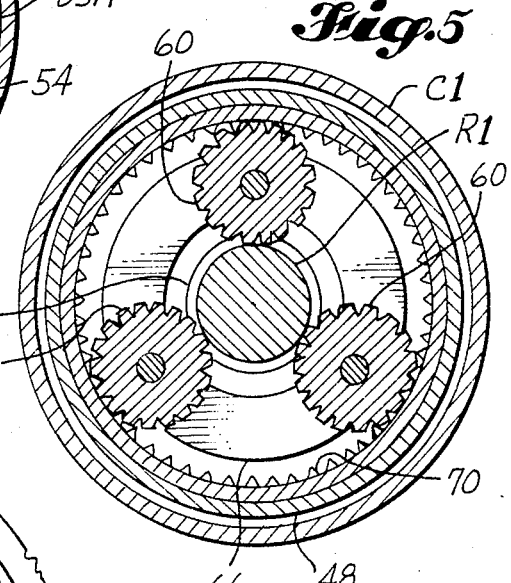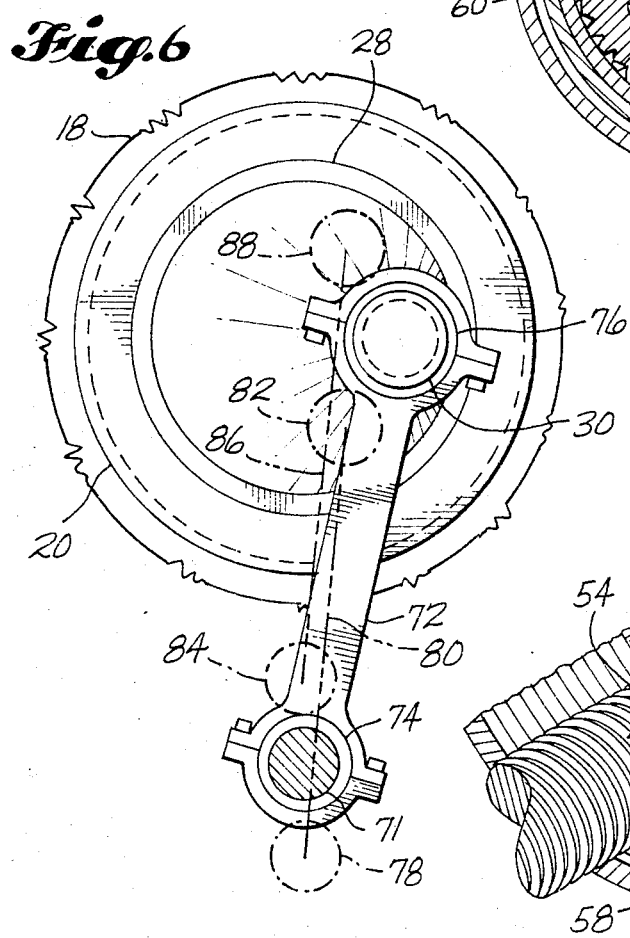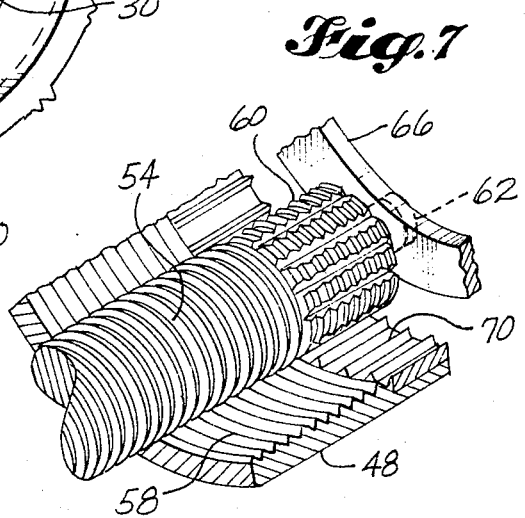

PROPELLER PITCH CONTROL SYSTEM AND APPARATUS

DESCRIPTION

1. Technical Field

This invention pertains to propeller pitch control systems. More particularly, it pertains to an efficiently packaged all-electric system that does not use electro/mechanical contacts such as commutator brushes or brush/slip ring contacts, the system providing a high mechanical advantage for adjusting propeller pitch.

2. Background Art

Variable pitch propellers have long been known in the art. Such propellers have the capability to either increase or decrease propeller pitch for maintaining constant engine speed as the engine throttle is varied. Actuators operable for changing pitch have been developed for use in such systems and are well-known in the art.

Propeller technology has been advancing in recent years. For example, FIGS. 1 and 2 illustrate the evolution of propeller technology. FIG. 2 shows that current technology provides propellers that can drive airplanes at speeds from Mach 0.4 to Mach 0.7. Advanced technology propellers, however, have the capability of propelling airplanes from approximately Mach 0.7 to Mach 0.85, which is comparable to the speeds of many airplanes which are currently being driven by turbofan engines. This ability to increase the speed of propeller driven airplanes, and the fact that advanced technology propellers are quieter, has spurred a renewed interest in turbo-prop driven airplanes. This is because turbo-prop engines are known to be more fuel efficient than turbofan engines. Therefore, increasing the speed of turbo-prop driven airplanes can make them commercially competitive with many of the airplanes which are currently being driven by turbofan engines.

The blades on advanced technology propellers have an airfoil design which is modified from the current techology propellers. This has resulted in higher than usual torque loads on individual propeller blades. Therefore, a need has arisen for the development of new propeller pitch control systems that can provide a high mechanical advantage for counteracting such higher torque loads.

Past propeller pitch control systems have typically been in the form of either mechanical/hydraulic or electro/mechanical/hydraulic systems. There have been a number of problems associated with such systems. For example, those systems which utilize hydraulics require intricate fluid conduits and seals for the hydraulic fluid. Such systems have been complex in design which has resulted in certain associated maintenance and reliability problems. Electrical components in these systems have required reduction gears, commutator brushes, slip rings, and brush/slip ring contacts which have also been known to have certain maintenance and reliability problems. A disadvantage to past systems is that the maintenance and reliability problems associated with them have been known to be enhanced at high altitudes. This may be particularly disadvantageous for airplanes driven by advanced technology propellers in that such airplanes will probably be turbo-prop driven and designed to cruise at high altitudes.

In addition to a need for the development of pitch control systems that can solve the above-noted problems, there is an ongoing need to develop such systems that can be efficiently packaged in a propeller hub, or counter-rotating hubs, in a lightweight and economical manner. This is especially important for systems that utilize redundant actuators wherein one actuator provides a backup for another actuator in the event of its failure.

Prior art patent literature which is known to be pertinent to the present invention is as follows:

| | |
|---|---|
| U.S. Pat. No. 1,879,142 | Egan |
| U.S. Pat. No. 2,236,841 | Waseige |
| U.S. Pat. No. 2,382,460 | Young |
| U.S. Pat. No. 2,394,299 | Friedrich |
| U.S. Pat. No. 2,455,239 | Doussain |
| U.S. Pat. No. 2,462,182 | Guerdan |
| U.S. Pat. No. 2,683,379 | Strandgren |
| U.S. Pat. No. 2,696,268 | Marchant |
| U.S. Pat. No. 2,804,154 | Treseder |
| U.S. Pat. No. 2,931,928 | Fehn |
| U.S. Pat. No. 3,187,189 | Lang |
| U.S. Pat. No. 3,187,190 | Lang |
| U.S. Pat. No. 3,705,775 | Rioux |
| U.S. Pat. No. 3,806,064 | Murphy |
| U.S. Pat. No. 3,997,131 | Kling |
| U.S. Pat. No. 4,227,860 | Humphreys |

Other literature which is known to be pertinent is the TRANSROL catalog published by La Technique Integrale, B.P. 96, 73003 CHAMBERY, France.

BRIEF DESCRIPTION OF THE DRAWINGS

Like reference numberals and letters are used to designate like parts throughout the several views, and:

FIG. 4 is an enlarged sectional view of an electromechanical linear actuator for a propeller pitch control system like that shown in FIG. 3, looking aft along line A—A in FIG. 3;

FIG. 5 is an enlarged sectional view of an actuator like that in FIG. 4, looking aft along line B—B in FIG. 3;

FIG. 6 is an enlarged fragmentary view in partial section of a base of a propeller, and a linkage for connecting the propeller to an actuator like that shown in FIG. 3, looking upwardly along line C—C in FIG. 3;

FIG. 7 is an enlarged fragmentary pictorial view of an end of a planetary roller like one of the rollers shown in FIG. 5, and shown the connection of the planetary roller to a carrier ring;

DISCLOSURE OF THE INVENTION

Figure 1:
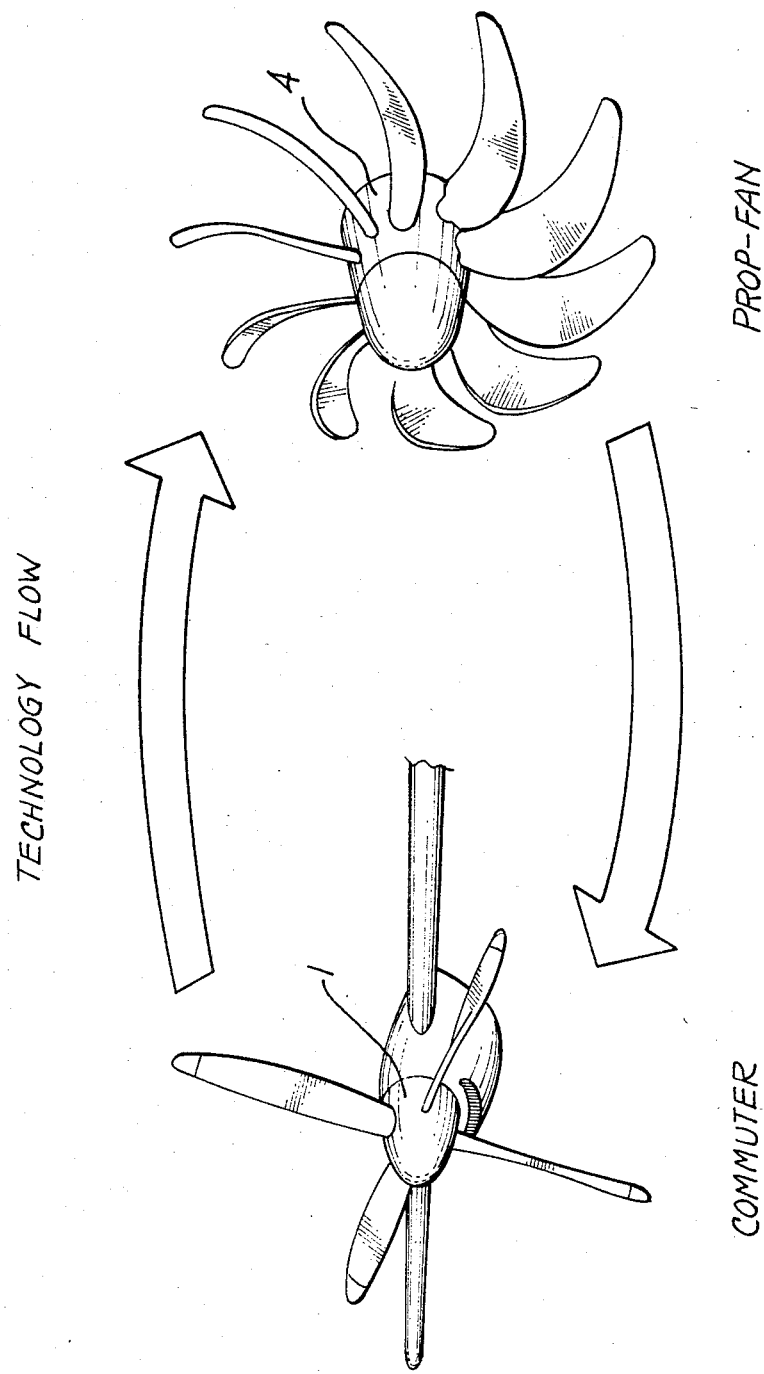
FIG. 1 is a pictorial view of two propellers showing the evolution of propeller technology from current to advanced technology.

The present invention provides an apparatus and system for adjusting the pitch of an airplane propeller or propellers, and is particularly suitable for use on counter-rotating propellers.

In accordance with the present invention, a basic embodiment includes an axially elongated tubular hub having a center axis about which the hub rotates. A plurality of propeller blades are mounted on the hub, each blade being rotatable about a radial axis for changing its pitch. An electromechanical linear actuator is provided for rotating the blades for pitch changing.

The actuator is housed within the hub, and has a longitudinal axis that coincides with the center axis of the hub. In basic form, the actuator includes a rod member which is connected to the hub, and a casing which is axially extendable and retractible relative to the rod member. The casing houses a rotary electric motor and a planetary screw drive transmission means. The electric motor includes a rotor which is drivingly interconnected to the casing by the planetary screw drive transmission means. The screw drive transmission means causes the casing to move axially in response to operation of the motor.

A mechanical drive means interconnects the casing and the propellers. The mechanical drive means causes the propellers to rotate and thus change their pitch in response to extension or retraction of the casing.

The planetary screw drive transmission means comprises an inner screw member, an outer screw member, and a plurality of planetary rollers. The inner screw member has a threaded outer surface and a center axis that coincides with the axis of the hub. The outer screw member includes a threaded inner surface and concentrically surrounds the inner screw member so that the threads of the outer member face the threads of the inner member. The threads of the outer member are spaced from the threads of the inner member so that an annular space is defined between them. The plurality of planetary rollers are positioned in said annular space and secured to a carrier means. Each roller has a threaded outer surface which engages with the threads of both the inner and the outer screw members.

The rotor of the electric motor is drivingly interconnected to one of said inner or outer members, or the carrier means, to produce rolling engagement of the threads of the planetary rollers with the threads of the inner and outer screw members. Rotation of the rotor causes a linear advance of the outer member relative to the inner member, with such advance being reversible according to the direction of motor rotation. The outer and inner screw members are drivingly connected to both the casing and the rod member such that the linear advance of the outer member relative to the inner member causes extension and retraction of the casing relative to the rod member.

In one embodiment of the invention, the outer screw member is in the form of an internally threaded ring member housed within the casing and drivingly connected thereto. The ring member is rotatable about the longitudinal axis of the actuator and is connected to the rotor of the electric motor. The inner screw member is in the form of an externally threaded portion of the rod member. As the electric motor drives the ring member in rotation, the ring member travels axially relative to the rod member. The driving connection of the ring member to the casing converts this axial travel into extension and retraction of the casing relative to the rod member.

In a second embodiment of the invention, the inner screw member is in the form of an externally threaded ring member. Instead of being drivingly connected to the casing, however, this ring member is drivingly connected to the rod member. In other respects, the ring member remains the same in that it is rotatable about the actuator longitudinal axis, and it is also connected to the rotor of the electric motor. In this second embodiment, the outer screw member is in the form of an internally threaded portion of the casing. As the ring member is driven in rotation by the motor, it travels axially relative to the casing. The driving connection of the ring member to the rod member converts such axial travel into extension and retraction of the casing relative to the rod member.

When the electric motor is operated to cause a linear advance of one of said screw members relative to the other, the planetary roller threads, the threads of the inner screw member, and the threads of the outer screw member have pitches, pitch diameters, and leads such that, for every rotation of one screw member relative to the other, the amount of linear advance of the outer member relative to the inner member is less than the lead of the threads of the inner member. In another embodiment of the invention, the threads of the planetary rollers, the threads of the inner screw member, and the threads of the outer screw member may have pitches, pitch diameters and leads such that, for every rotation of one screw member relative to the other, the amount of linear advance of the outer screw member relative to the inner screw member is greater than the lead of the threads of the inner screw member.

In either of the foregoing embodiments, a compression spring means is connected to the planetary screw drive transmission means for maintaining engagement of the threads of the planetary rollers with the threads of both the inner and outer screw members when the direction of rotation is reversed.

One object and advantage of the present invention is that it provides an electromechanical linear actuator that has a high mechanical advantage for varying the pitch of an advanced technology propeller blade. As was stated earlier, the blades of advanced technology propellers are subjected to higher torsional loads than the blades of current technology propellers. Therefore, an actuator having a higher mechanical advantage may be required for changing the pitch of the advanced technology blades.

An advantage to an actuator of the present invention is that a high mechanical advantage can be achieved by large diameter electromechanical linear actuators wherein the diameter of the inner screw member is substantially large relative to the diameters of the planetary rollers. This is especially advantageous in that large diameter actuators can enhance the construction of efficiently packaged redundant actuator arrangements, and such actuators are also well suited for use in counter-rotating propeller arrangements.

Another object and advantage of the present invention is that it can provide redundant actuators. For example, it is possible that a second electromechanical linear actuator may be housed within a hub. The second actuator may include a longitudinal axis that coincides with the axis of the hub, and its general construction may be in similar form to that of the first actuator. The casing of the second actuator can be connected to the first actuator so that if the first actuator fails, the second actuator can be operated to move the first actuator axially in response to such operation. This in turn causes the mechanical drive means to rotate the propellers for pitch changing.

The connection of the second actuator to the first may take different forms. For example, in one form the rod member of the first actuator may be connected to the casing of the second actuator. In another form, an outer surface portion of the casing of the second actuator could comprise the rod member of the first actuator. In such form, the rod members and casings of the actuators may be in substantially concentric relationship. This is an advantage to the present invention in that having redundant actuators in concentric relationship provides a means for efficiently packaging actuators in a propeller hub or hubs. Large diameter actuators would be particularly suitable for such packaging.

Another advantage to the present invention is that it is well suited for use in a counter-rotating propeller arrangement. In such an arrangement, a second axially elongated tubular hub may be mounted forwardly of the first hub. In a manner similar to the first hub, a plurality of propeller blades may be mounted on the second hub, each being rotatable about its radial axis for changing pitch. At least one actuator can be housed within the second hub for such pitch changing.

The second hub may be connected to a drive shaft which mounts the second hub forwardly of the first. Each electromechanical linear actuator housed within the first hub includes an opening extending along its longitudinal axis. Such opening permits the drive shaft to extend therethrough for mounting and driving the second hub in a position forwardly of the first. Large diameter actuators are well suited for use in this kind of arrangement.

A first and second electromechanical linear actuator may be housed within the second hub for changing the pitch of the propeller blades mounted to that hub. These actuators can be in redundant relationship in a manner like that which was discussed above.

A further object and advantage to the present invention is that it provides a propeller pitch control system that is all-electric. The hub, or hubs (if the invention is used in a counter-rotating propeller arrangement), will for example be mounted for rotation to a fixed support on an aircraft. An electrical power transmission means provides electricity to the motor of each electromechanical actuator for moving casings relative to rod members. Such electrical power transmission means may include a rotor portion mounted to the hub and electrically connected to an actuator motor, and a stator portion mounted to the fixed support and connected to an electrical power source. The rotor portion is adjacent the stator portion so that electricity for powering an actuator motor can be transmitted between the rotor and stator portion as the hub rotates. In preferred form, the power transmission means is in the form of at least one toroidal rotary transformer which does not utilize brush/slip ring contacts.

In furtherance of the object to provide an all-electric pitch control system, the motors used in the electromechanical linear actuators may typically be in the form of electronically commutated (or brushless) DC motors. Such motors can provide high torque power to an actuator, but at low speeds. This eliminates the need for gear reduction mechanisms in a pitch control system. In addition, these motors do not use conventional brush/slip ring contacts, thereby eliminating any maintenance and reliability problems associated with such contacts.

Therefore, the present invention provides a pitch control system that does not require complex hydraulics. It also provides a system that does not utilize conventional electric motor gear reduction mechanisms, commutator brushes, slip rings, and brush/slip ring contacts.

The objects and advantages of the invention will become more apparent when the best mode for carrying out the invention is read in conjunction with the appended drawings.

BEST MODE FOR CARRYING OUT THE INVENTION

Figure 2:
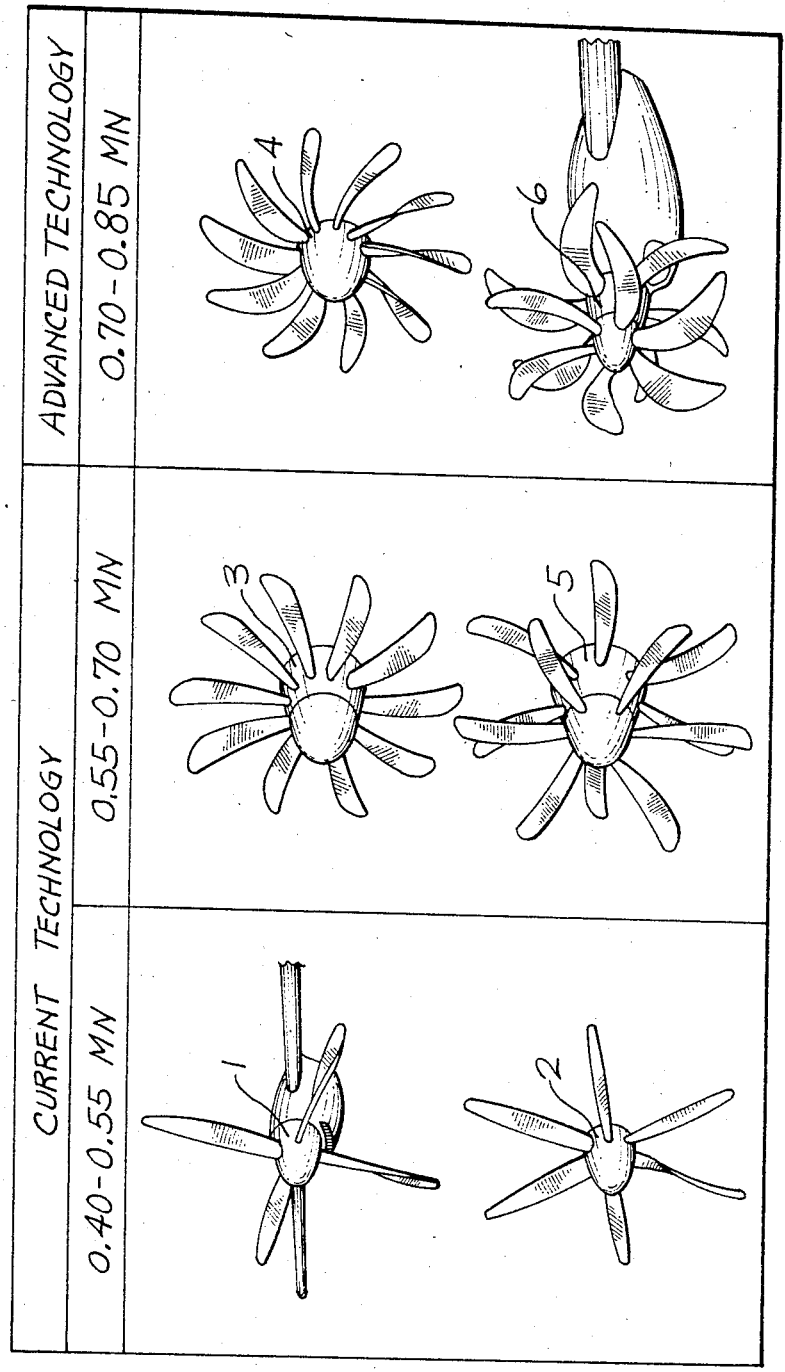
FIG. 2 is a pictorial view showing a plurality of current and advanced technology propellers, and showing the various speeds that can be achieved by airplanes driven by such propellers.

In accordance with the present invention, an apparatus is provided for adjusting the pitch of propellers like those shown in FIGS. 1 and 2. Various embodiments of the invention are suitable for use in either single propeller hubs 1-4 (see FIGS. 1 and 2), or dual counter-rotating hubs 5, 6 (see the lower right hand corner of FIG. 2). Certain embodiments of the invention are particularly well suited for use in counter-rotating hubs.

In order to facilitate this description, and to make the construction of the invention better understood in light of the appended claims, a first embodiment which illustrates the general elements of the invention will be described first.

Figure 3:
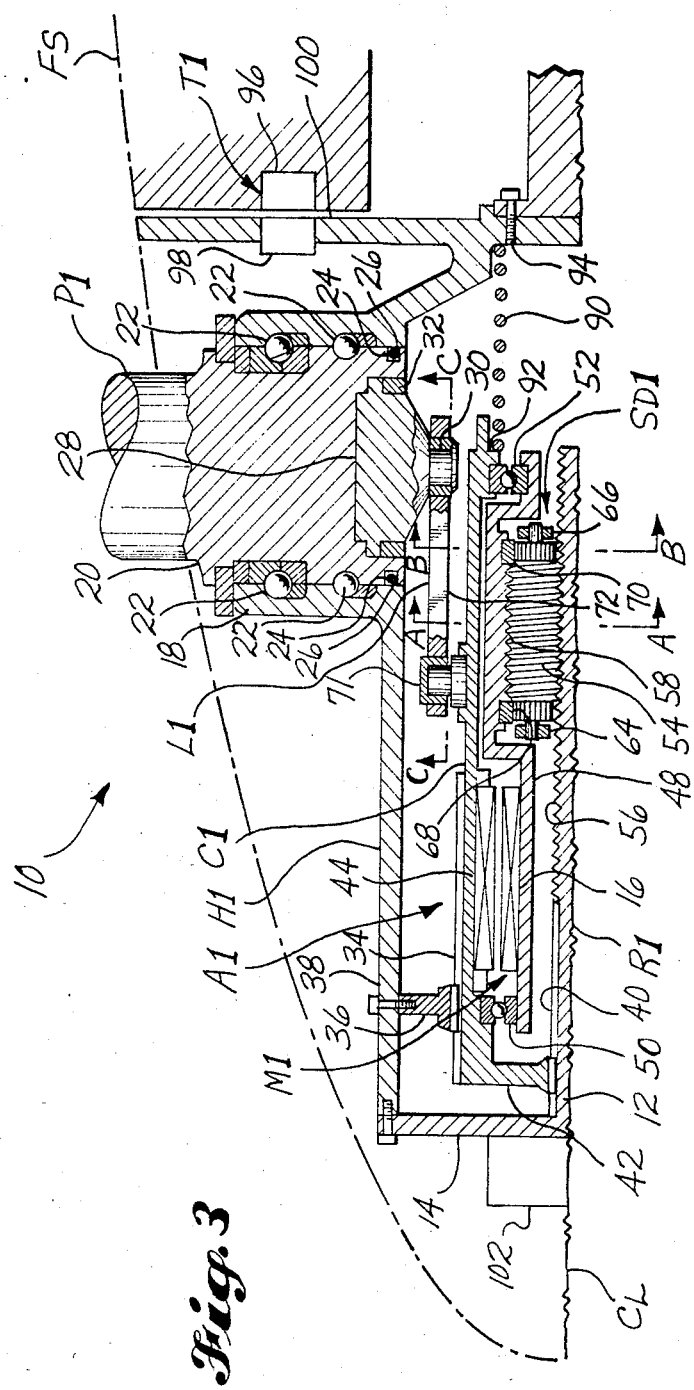
FIG. 3 is a longitudinal sectional view of a propeller pitch control system housed with a hub, showing the hub and system only on one side of a centerline axis of symmetry, the hub and system being mounted to a fixed support of an aircraft for rotation about the centerline axis.

Reference numeral 10 in FIG. 3 indicates generally a first embodiment for adjusting the pitch of a plurality of propellers which are mounted to a single hub. An axially elongated tubular hub H1 is mounted to a fixed support FS of an aircraft. The hub H1 is mounted for rotation about a center axis CL which extends forwardly of the fixed support FS. A plurality of propeller blades are mounted to the hub H1, each propeller being rotatable about a radially extending axis. The propeller blades are mounted to the hub H1 in a symmetric configuration. Therefore, it is necessary for only one propeller blade P1 to be presented and described herein.

An electromechanical linear actuator A1 having a longitudinal axis that coincides with the center axis CL of the hub H1 is housed within such hub. The actuator A1 includes a rod member R1, a casing C1, a rotary electric motor (indicated generally by M1), and a planetary screw drive transmission means (indicated generally by SD1). The planetary screw drive transmission means described for the various embodiments of the invention shall hereinafter be referred to simply as a screw drive.

The rod member R1 is fixed in position relative to the hub H1 by rod end portion 12 which is connected to an inner surface of hub end portion 14. The casing C1 is extendible and retractable axially relative to the rod member R1. The mechanical means for causing such extension and retraction is provided by the screw drive SD1 which is positioned between the rod member R1 and the casing C1. The screw drive SD1 drivingly connects a rotor 16 of the electric motor M1 to the casing C1 for causing the casing to move axially in response to operation of the motor M1.

Electricity for operating the motor M1 is provided by an electrical power source located in the aircraft. An electrical power transmission means preferably in the form of at least one toroidal rotary transformer T1 transmits electricity from the power source to the motor M1. A more detailed description of this transformer will be provided subsequently.

A mechanical drive means in the form of a pitch control link L1 connects the casing C1 to the propeller P1. Extension and retraction of the casing C1 moves the pitch control link L1 generally forward and aft which in turn moves the propeller P1 for changing pitch.

Having thus generally described the foregoing elements of a first embodiment, these elements will now be described in greater detail. It should be noted that in the description which follows, certain elements of the embodiments are described as being rotatable relative to other elements. It should be kept in mind that such elements rotate with the particular propeller hub in which they are housed. Therefore, any description of rotation of one element relative to another means that such rotation is also relative to a rotatable propeller hub, or hubs.

The propeller P1 in FIG. 3 is mounted to a radially projecting tubular portion 18 of the hub H1. Tubular portion 18 includes a substantially cylindrical opening for receiving the base 20 of the propeller P1. The propeller P1 is held in place by an arrangement of thrust bearings 22 positioned in the interfacing region between the walls of base 20 and the tubular portion 18. A radially inwardly projecting seal 24 is provided in a radial groove 26 in the base 20. The base 20 includes a removable end fitting 28 that has a downwardly projecting pin 30. The pin 30 is offcenter relative to the radial axis of the propeller P1. This position is best seen in FIG. 6. The end fitting 28 is prevented from rotating relative to the base 20 by keys 32 which are positioned between the end fitting and the base. This configuration, as described, illustrates a typical construction for the connection of a propeller to a rotating hub. Such a construction is common and well-known to those skilled in the art to which this invention pertains.

The propeller P1 is rotatable about its radial axis by the actuator A1. The actuator casing C1 can extend or retract relative to the rod member R1 for accomplishing such rotation. Neither the rod member R1 nor the casing C1 rotate relative to the hub H1. As was described above, rod end portion 12 is connected to hub end portion 14. This connection prevents rotation of the rod member R1. Rotation of the casing C1 is prevented by a spline 34 on the outside of the casing which travels through a groove in a guiding member 36. The guiding member 36 is connected to an upper wall portion 38 of the hub H1. Another spline 40 is located on the outside surface of the rod member R1 which provides a guide for a groove in casing end portion 42. The combined action of splines 34, 40, guiding member 36, and the groove in the casing serve as an anti-rotation device for preventing rotation of the casing C1.

The rod member R1 and the casing C1 are in the form of substantially cylindrical annular members that are in concentric relationship of each other. An annular region is defined between the casing C1 and the rod member R1 in which a stator and rotor 44, 16 of the electric motor M1, and the screw drive SD1 are positioned.

In preferred form, the motor M1 is an electronically commutated (or brushless) DC motor. The stator 44 is mounted to the inside surface of the casing wall. The rotor 16 is mounted to a ring member 48. Thrust bearings 50, 52 located at each end of the ring member 48 connect the ring member to the inside surface of the casing wall. The rotor 16 drives the ring member 48 in rotation about the center axis CL. In this embodiment, the screw drive SD1 is comprised of the ring member 48, a plurality of planetary rollers 54, and a threaded portion 56 of rod member R1. Rotation of the ring member 48 causes the screw drive SD1 to move the casing C1 axially relative to the rod member R1 for changing propeller pitch.

In general form, and referring particularly to FIG. 4, the screw drive SD1 includes an inner screw member (ISM), an outer screw member (OSM) that concentrically surrounds the inner screw member, and a plurality of planetary rollers (PR) positioned in an annular space between the inner and outer screw members. In accordance with the embodiment shown in FIG. 3, the inner screw member is in the form of the threaded portion 56 on the outer surface of rod member R1. The outer screw member is in the form of a threaded portion 58 on an inside surface portion of the ring member 48. Threaded portions 56 and 58 are in concentric relationship and have a center axis coinciding with the center axis CL. The threaded portion 58 of the ring member 48 radially faces the threaded portion 56 of the rod member R1. Positioned in the annular space between the threaded portions 56, 58 is a plurality of threaded planetary rollers 54. The threads of the rollers 54 engage with the threaded portion 56, 58, so that rotation of ring member 48 produces a rolling engagement of the planetary rollers 54 with the ring and rod member 48, R1. Such rolling engagement drives the ring member 48 axially relative to the rod member R1. Since the ring member 48 is drivingly connected to the casing C1 by thrust bearings 50, 52, it too moves axially. Therefore, the rolling engagement of the planetary rollers 54 with the threaded portions 56, 58 of the ring and rod members transfers the power from the electric motor M1 into axial movement of the casing C1.

Directing attention now to FIG. 7, the ends 60 of the planetary rollers are toothed and terminate in cylindrical spiggots or studs 62. The studs 62 are connected to carrier rings 64, 66, one carrier ring being positioned at each end of the rollers. The threaded portion 58 of ring member 48 has two ring gear portions 68, 70 which mesh with the toothed ends 60 on each end of the rollers. Such meshing prevents the rollers from being displaced by sliding in relation to the ring member, and insures that the rollers will remain in a constant axial position relative to the ring member. Therefore, as the ring member 48 translates axially relative to the rod member, the rollers 54 likewise translate with the ring member.

The above-described screw drive SD1 is similar to the screw-threaded mechanism disclosed by C. B. Strandgren in U.S. Pat. No. 2,683,379, granted on July 13, 1954. An anti-friction screw in accordance with the Strandgren patent is manufactured by La Technique Integrale of Chambery, France under the trademark name (TRANSROL). Information concerning this anti-friction screw can be obtained by writing to La Technique Integrale at the following address: B.P. 96, 73003, Chambery, France.

Mounted on the outer surface of casing C1 is a pin 71. Pin 71 is connected to pin 30 on the base of the propeller by a linkage arm 72. The linkage arm 72 is connected to the pins 71, 30 by combination bearings 74, 76. By way of example only, FIG. 6 shows how the linkage arm 72 operates to change the pitch of propeller P1 as the casing C1 moves axially. Those dashed lines which are indicated by reference numerals 78, 80, and 82 indicate the position of pin 71, linkage arm 72, and pin 30, respectively, when the casing C1 is in a retracted position. When in such position, the end 42 of the casing would be substantially adjacent the inside surface of the hub end portion 14. Reference numerals 84, 86, and 88 show the position of pin 71, linkage arm 72, and pin 30, respectively, when the casing C1 is in a substantially fully extending position. It is to be understood, of course, that linkage arm 72 in FIG. 6 is shown merely by way of example. Other forms of such linkage arms may be far more suitable for adjusting propeller pitch. It is to be further understood that the casing C1 could have a plurality of pins and linkage arms mounted on its outer surface for changing the pitch of a plurality of propellers.

The electric motor M1 is reversible for extending and retracting the casing. When the direction of the motor M1 is reversed, it is important to maintain engagement of the threads of the planetary rollers with the threads of the ring and rod members so as to prevent any play or slippage between them. The possibility for having such slippage is eliminated by providing a compression spring 90 in position between the aft end 92 of the casing C1 and a rearward portion 94 of the hub.

In a preferred embodiment of the invention, electrical power is provided to the electric motor M1 by a toroidal rotary transformer T1. The transformer T1 has a stator portion 96 and a rotor portion 98. The stator 96 is mounted to the fixed support FS, and the rotor 98 is mounted to a rearward wall portion 100 of the hub. The stator 96 is electrically connected to an electrical power source located in the aircraft. The rotor 98 is electrically connected to the motor M1. The rotor 98 is positioned adjacent the stator 96 in non-contacting relationship so that electricity for powering the motor M1 is transmitted between the two portions.

Figure 11:
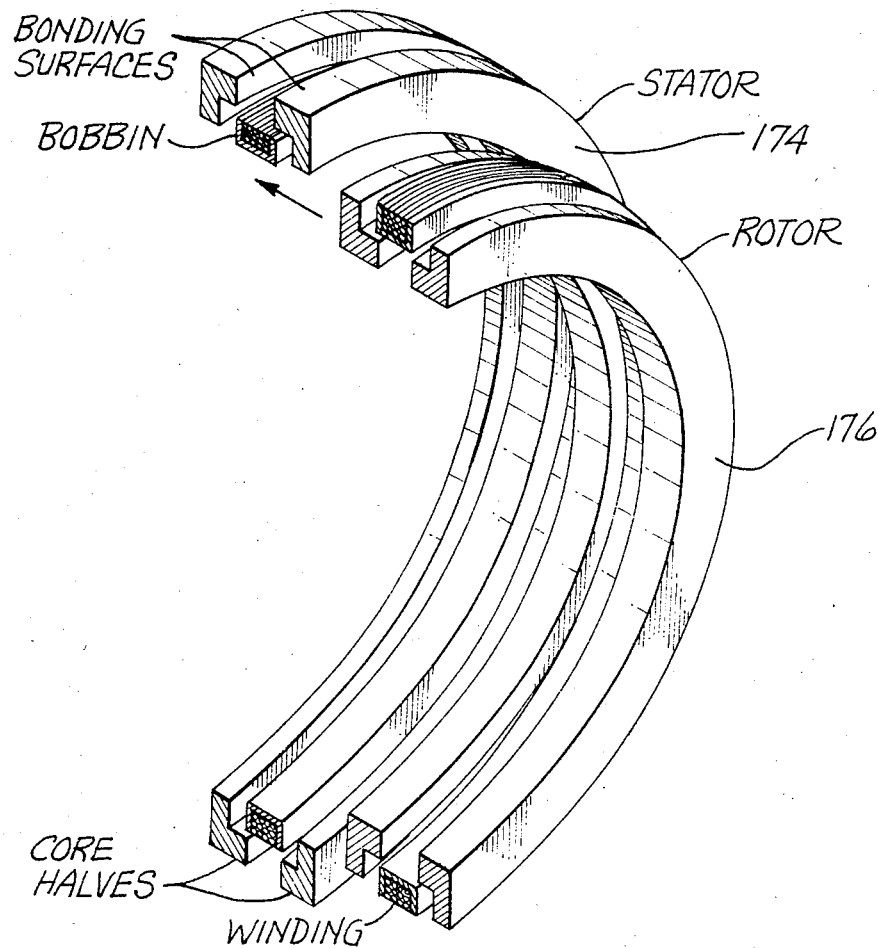
FIG. 11 is a pictorial view showing two half sections of a pair of annular members of a toroidal rotary transformer.

Transformer T1 provides power to the electric motor M1 by transmitting electricity to a control unit 102 mounted on the outer surface of the hub end portion 14. The electrical connection between the rotor 98 and control unit 102 is not shown. The control unit operates the motor M1 for changing propeller pitch. As an illustrative example only, a typical toroidal transformer is shown in FIG. 11. This FIG., however, shows a transformer in the form of two concentric annular rings 174, 176 which is different from that shown in FIG. 3. The transformer in FIG. 3 is constructed of two parallel annular rings having equal diameters. A side face of one ring is adjacent but in non-contacting relationship with a side face of the other ring. Both the stator and the rotor portions have toroidal windings for transferring power between them. The construction of such a transformer is well understood by those skilled in the art to which this invention pertains.

Figure 8:
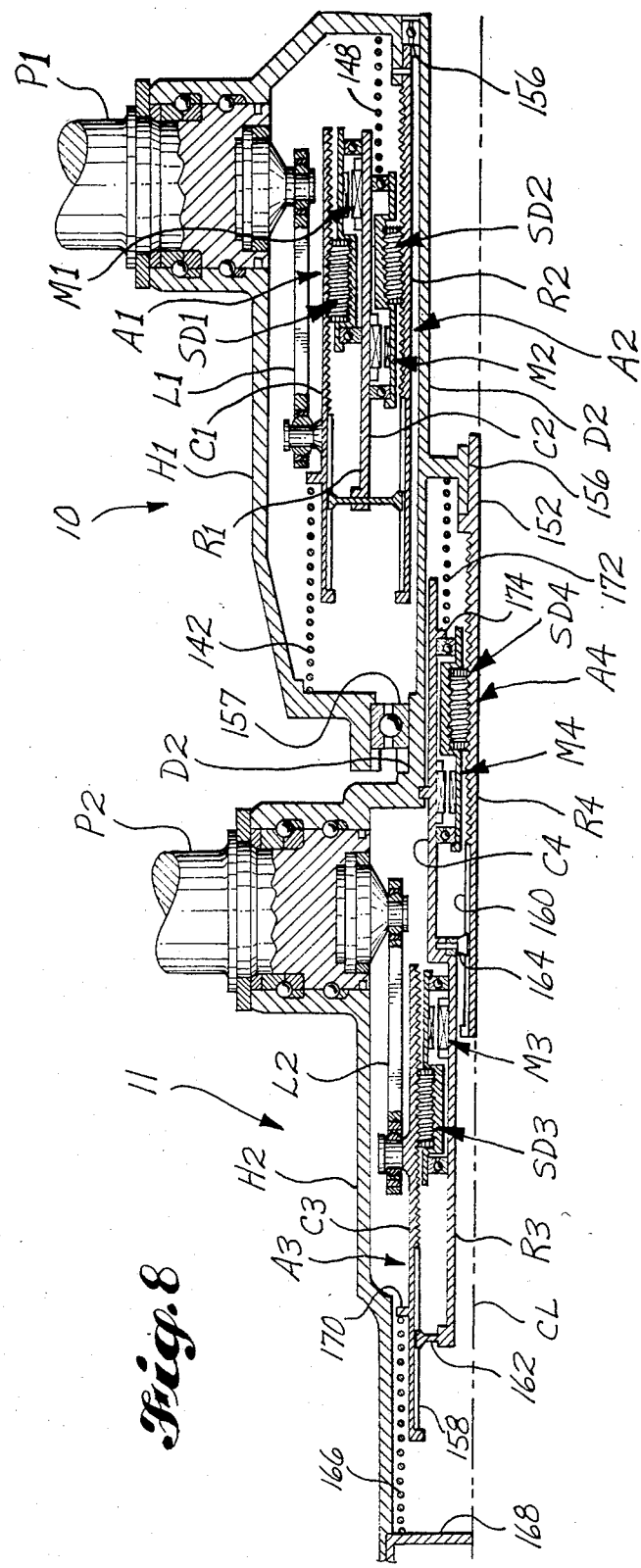
FIG. 8 is a longitudinal sectional view of a pair of counter-rotating propeller hubs, and pitch control systems housed within the hubs, showing the hubs and systems only on one side of a centerline axis of symmetry, the hubs and systems being rotatable about the centerline axis.
Figure 9:
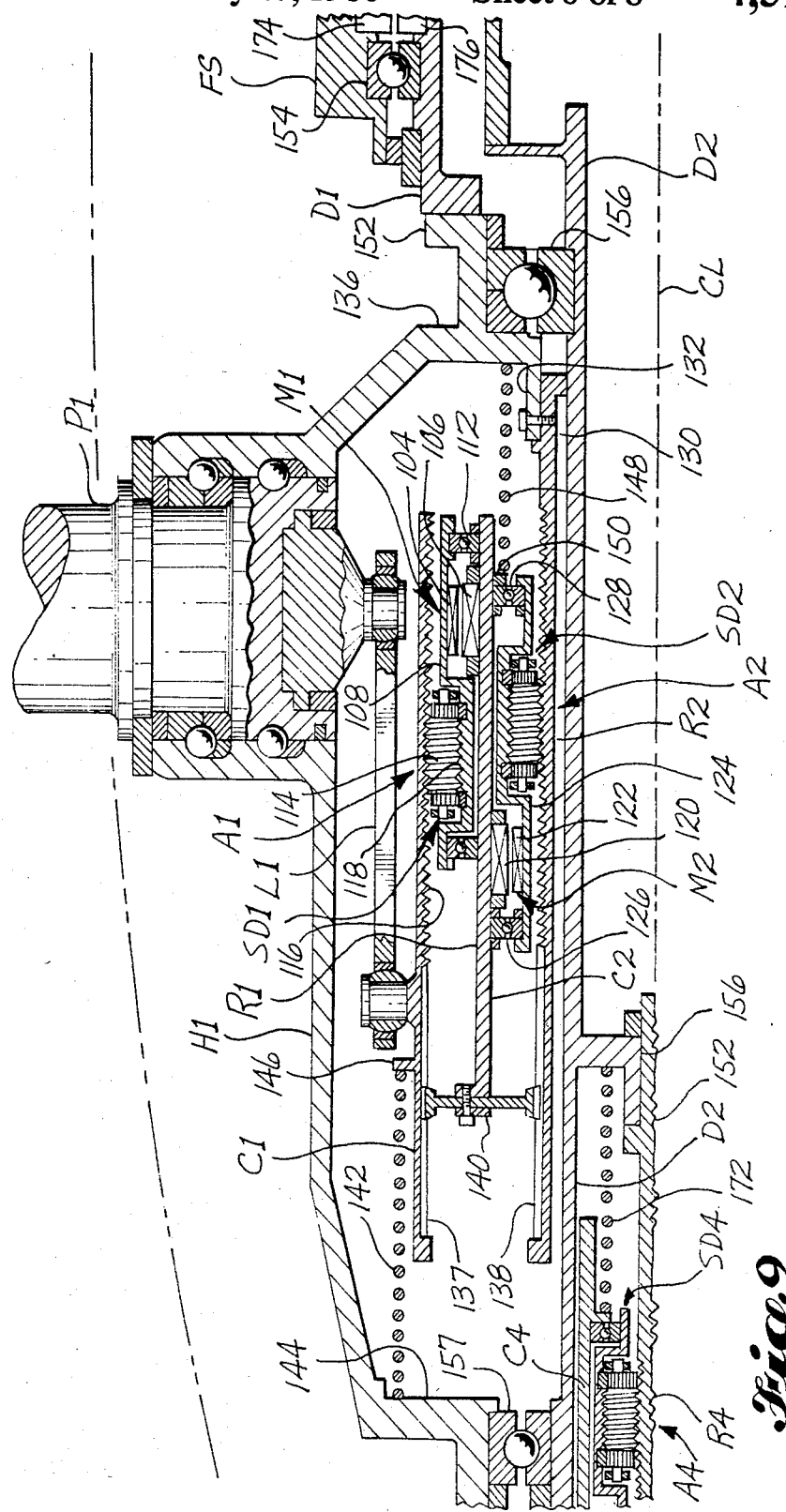
FIG. 9 is an enlarged fragmentary longitudinal sectional view of the hub and pitch control system shown in the right hand side of FIG. 8.
Figure 10:
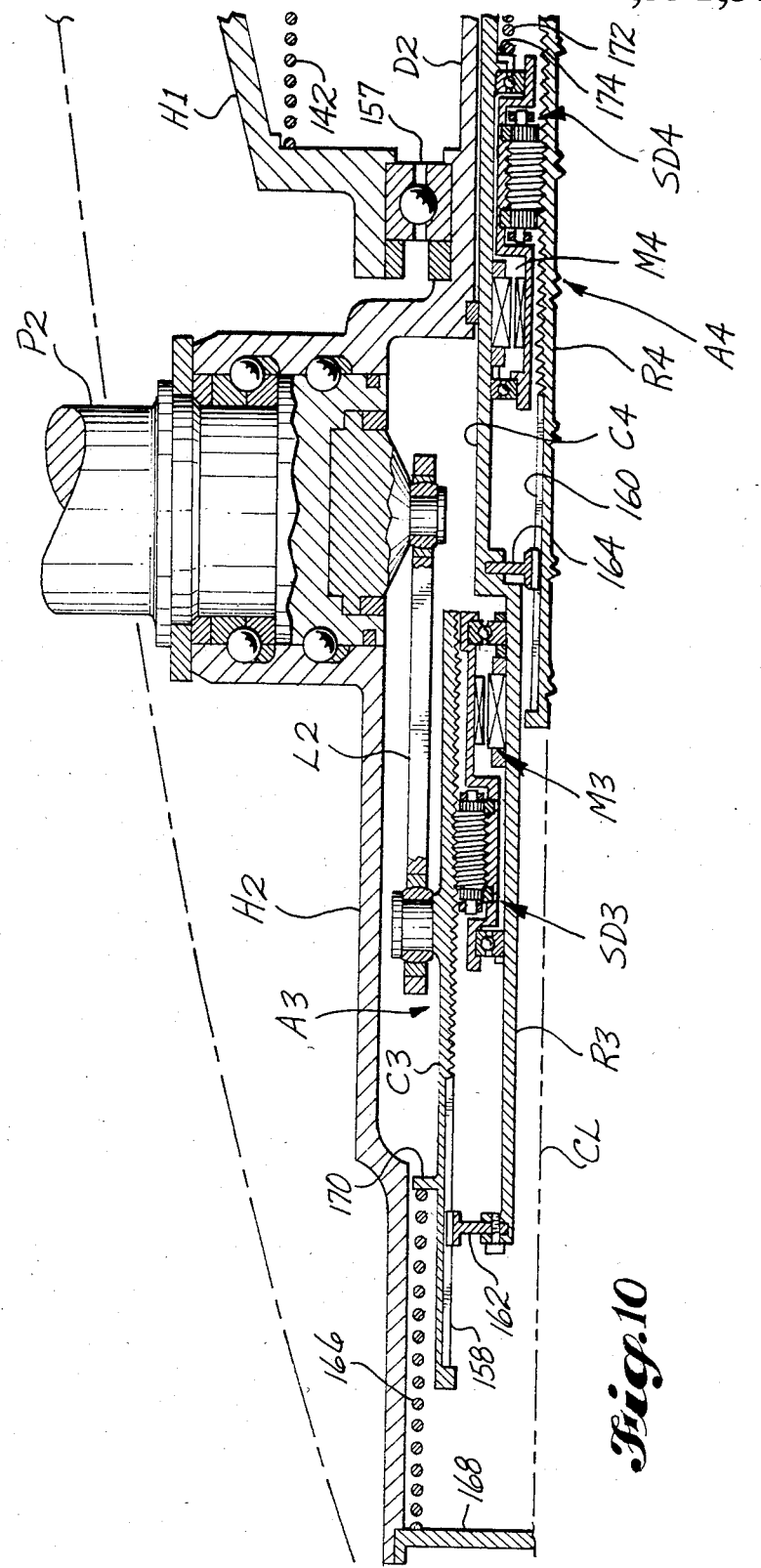
FIG. 10 is an enlarged fragmentary longitudinal sectional view of the hub and pitch control system shown in the left hand side of FIG. 8.

FIGS. 8-10 show pitch control systems 10, 11 housed within hubs H1, H2 having redundant actuators A1-A4 for adjusting propeller pitch. During a typical pitch adjustment, only one actuator in each hub is operated. If that actuator should fail, the second actuator provides a backup.

FIG. 8 shows a first propeller hub H1 and a second propeller hub H2 both mounted for rotation about a common center axis CL. Propeller hub H1 in this Fig. is similar in form to the propeller hub shown in FIG. 3. However, instead of a single actuator being housed in this hub, a pair of redundant actuators (indicated generally by A1, A2) are now housed therein. This arrangement is best seen by referring to the enlarged drawing of the hub H1 shown in FIG. 9.

The actuator A1 in FIG. 9 is similar to the actuator A1 in FIG. 3 in that both actuators include a rod member R1, a casing C1, a rotary electric motor M1, and a screw drive SD1. These elements are functionally the same for both actuators. However, there are structural differences between them. A first structural difference is that the rod member R1 of actuator A1 (in FIG. 9) comprises the casing C2 of the second actuator A2 housed within the first hub H1. This provides the aforementioned redundancy feature of the actuators. A second structural difference is the manner in which the electric motor M1 and the screw drive SD1 are positioned between the casing C1 and the rod member R1. This difference will be explained shortly.

In a manner like the embodiment shown in FIG. 3, the casings, screw drives, and rod members of the actuators A1, A2 in FIG. 9 are in the form of substantially cylindrical or annular members that have a concentric relationship. Referring first to actuator A1, an annular region is defined between the casing C1 and the rod member/casing R1/C2. Stator and rotor portions 104, 106 of the electric motor M1, and the screw drive SD1 are positioned in this region. The motor M1 may be in the same form as the motor which was described previously for the FIG. 3 embodiment. For the embodiment shown in FIG. 9, however, the stator 106 is mounted to the outside surface of the rod member/casing R1/C2. The rotor 104 is connected to a ring member 108, but thrust bearings 110, 112 connect the ring member 108 to the outside surface of the rod member/casing R1/C2. This is different from the FIG. 3 embodiment in that in the FIG. 3 embodiment the stator 44 and ring member 48 are connected to the inside surface of the casing C1.

The screw drive SD1 in FIG. 9 includes a threaded portion 118 of the ring member 108, a plurality of planetary rollers 114, and a threaded portion 116 of the casing C1. Rotation of the ring member 108 by the motor M1 causes the screw drive SD1 to move the casing C1 axially. The screw drive SD1 is substantially the same as the screw drive of the FIG. 3 embodiment in that both include an inner screw member, an outer screw member that concentrically surrounds the inner screw member, and a plurality of planetary rollers positioned in an annular space between the inner and outer screw members. In this embodiment, however, the inner screw member is in the form of a threaded portion 118 on the outer surface of the ring member 108. The outer screw member is in the form of a threaded portion 116 on an inside surface portion of the casing C1. The threaded portions 116, 118 are in concentric relationship and have a center axis that coincides with the center axis CL.

The threaded portion 118 radially faces the threaded portion 116 with an annular space being defined between them. Positioned in this annular space is the plurality of threaded planetary rollers 114 which engage with the threaded portions 116, 118. Rotation of the ring member 108 produces rolling engagement of the planetary rollers 114 with the threaded portions 116, 118. Such rolling engagement is exactly the same as that which was described for the FIG. 3 embodiment. However, as was noted previously, the ring member 108 is drivingly connected to the rod member/casing R1/C2, as opposed to being connected to the casing C1. Therefore, in the embodiment shown in FIG. 9, the ring member 108 does not move axially relative to the rod member/casing R1/C2. Rather, it is solely the casing C1 which moves axially relative to the ring member 108, planetary rollers 114, and the rod member/casing R1/C2.

The manner by which the planetary rollers 114 are positioned between the threaded portions 116, 118 of the casing and ring member is substantially the same as that which was described for the FIG. 3 embodiment. The planetary rollers 114 have toothed ends which mesh with ring gear portions on the ring member.

Therefore, to summarize the primary difference between the screw drives SD1 of FIGS. 3 and 9, the screw drive in this second embodiment is structurally reversed in comparison to the first. The ring member 108 is externally threaded in the FIG. 9 embodiment, whereas the ring member 48 in the FIG. 3 embodiment is internally threaded.

The second actuator A2, however, is structurally similar to the actuator A1 previously described in FIG. 3. The rod member/casing R1/C2 of the second actuator A2 is extendible and retractable axially relative to the rod member R2. An annular region is defined between the rod member/casing R1/C2 and the rod member R2 wherein stator and rotor portions 120, 122 of an electric motor M2, and a screw drive SD2 are located. The stator 120 is mounted to the inside surface of the rod member/casing R1/C2. The rotor 122 is connected to a ring member 124. Thrust bearings 126, 128 located at each end of the ring member 124 connect the ring member to the inside surface of the rod member/casing. The construction and operation of the screw drive SD2 in the second actuator is exactly the same as the screw drive SD1 that was described for the FIG. 3 embodiment. Therefore, there is no need to describe this screw drive SD2 further.

Rotation of the ring member 124 causes the screw drive SD2 to move the rod member/casing R1/C2 axially relative to the rod member R2. Since the casing of the second actuator A2 is the same structural member as the rod member of the first actuator A1, operating the second actuator causes the casing C1, screw drive SD1, and rod member/casing R1/C2 to move axially relative to the rod member R2. The end 130 of the rod member R2 is connected to a flange 132 on an aft wall portion 136 of the first hub H1. This connection provides a fixed support for the extension and retraction of the actuator casings.

The actuators A1, A2, are constructed so that none of the casings or rod members rotate relative to the hub H1. For example, casing C1 and rod member R2 each have splined portions 137, 138, respectively. The splines 137, 138 travel through grooves in a guiding member 140 which is connected to a forward end portion of rod member/casing R1/C2. Having such an arrangement prevents the casing C1 and the rod member/casing R1/C2 from rotating relative to the rod member R2. Since the rod member R2 is connected directly to the hub H1, all the rod members and casings are prevented from rotating.

The actuators A1, A2 are connected to the propeller P1 by a pitch control link L1. This link L1 can be connected to the outer surface of the casing C1 in substantially the same manner as that which was previously described in the FIG. 3 embodiment so that operation of either actuator A1, A2 causes a corresponding adjustment of propeller pitch.

In a manner similar to the embodiment shown in FIG. 3, the electric motors M1, M2 housed within the first and second actuators A1, A2 are reversible for extending and retracting the casings relative to the rod members. As was previously discussed, it is important to maintain engagement of the threads of the planetary rollers with the threads of the ring and rod members so as to prevent slippage and play between them. Therefore, a first spring 142 is positioned in compression between an inside surface 144 of the hub, and a radially projecting flange 146 on the actuator A1. In addition, a second spring 148 is positioned in compression between the inside surface of the aft wall 136 of the hub H1, and an abutment 150 located on an aft end portion of the second actuator. The two springs 142, 148 serve the same function as the spring 90 described in the FIG. 3 embodiment. Therefore, when the direction of either motor M1 or M2 is reversed, these springs prevent slippage and play between roller, ring member, casing, and rod member threads.

The hub H1 shown in FIG. 9 is the first hub of the pair of first and second counter-rotating hubs H1, H2 shown in FIG. 8. The hubs H1, H2 in FIG. 8 are mounted for rotation about the center axis CL. The embodiment shown in FIG. 9, and described above, is well suited for use in such a counter-rotating arrangement as will become apparent upon further reading of this description.

The first hub H1 is driven by a drive shaft D1 which is connected to a radial flange 152 on the aft portion 136 of the hub. The drive shaft D1 is mounted to a fixed support FS on the aircraft, with bearings 154 permitting rotation of this drive shaft relative to the support. Since the actuators A1, A2, and the elements thereof, are constructed in the form of substantially concentric annular bodies, the actuators A1, A2 in the first hub H1 may have an opening through which a second drive shaft D2 can extend. This is shown in FIGS. 8-10, wherein a substantially cylindrical opening in the actuators A1, A2 permits a second drive shaft D2 to mount the second hub H2 forwardly of the first. Rotation of the second drive shaft D2 and the second hub H2 relative to the first hub and drive shaft H1, D1 is permitted by means of bearings 156, 157.

Housed within the second hub H2 are two electromechanical linear actuators A3 and A4. Actuator A3 includes a casing C3 which extends and retracts relative to a rod member R3. A planetary screw drive SD3 and an electric motor M3 are positioned between the casing C3 and the rod member R3 for extending and retracting the casing. The casing C3, screw drive SD3, motor M3, and rod member R3 are constructed in a manner like that which was described for the actuator A1 housed within the first hub H1.

The other actuator A4 includes a casing C4, screw drive SD4, motor M4, and rod member R4 constructed in a manner which is substantially like that which was described for the actuator A2 (and the actuator A1 of the FIG. 3 embodiment) housed within the first hub H1. An end of the casing C4 is connected to an end of the rod member R3 of the first actuator A3. The rod member R4 is connected at its end 152 to a flange portion 156 of the second drive shaft D2. Similar to the other actuators, the actuator A4 includes a planetary screw drive SD4 and an electric motor M4 positioned in an annular region between the casing C4 and the rod member R4.

Since the rod member R4 of the second actuator A4 is connected directly to the drive shaft D2, it is prevented from rotating relative to the second hub H2. Likewise, the casings C3, C4 and the rod member R3 are prevented from rotating relative to the second hub H2 by splines 158, 160 which slide through grooves in guiding members 162 and 164. This construction is similar to that which was described for the other actuators.

When the motors M3 and M4 are reversed, slippage and play of the screw drive threads must be prevented. To keep the screw drive threads engaged, a spring 166 is connected between the inner surface 168 of the forward portion of the first hub H1 and a radial flange 170 on the outer surface of the casing C3. Another spring 172 is positioned between an abutment 174 located on the rearward end portion of the second actuator casing C4 and the flange 156 on the second drive shaft D2. Both of the springs 166, 172 are in compression and serve the same purpose as springs 142, 148 in the first hub H1.

The actuator A3 is connected to a propeller P2 by a pitch control link L2. This connection may be substantially the same as that which was described for the FIG. 3 embodiment. In a manner similar to the actuators A1, A2 of the first hub, the actuators A3, A4 are in redundant relationship. In other words, for a typical pitch adjustment of propeller P2, the casing C3 of the first actuator A3 extends and retracts relative to the rod member R3. In the event of the first actuator A3 failing, the second actuator A4 can be operated in much the same way as that which was described for the actuators A1, A2 in the first hub.

Power can be supplied to the four actuators A1-A4 from a source in the aircraft by using toroidal rotary transformers. By way of example only, at least one concentric toroidal rotary transformer, like that shown in FIG. 11, can have a stator 174 mounted to the fixed support FS of the aircraft, and a rotor 176 connected to the first drive shaft D1. The stator 174 is adjacent the rotor 176 in non-contacting relationship so that electricity for powering one or both actuators in the first hub H1 can be transmitted between the stator and rotor. It is to be understood, of course, that a plurality of toroidal transformers would probably be used for providing electricity to more than one actuator housed within any one hub. Toroidal transformers could also be used for providing electricity to the actuators A3, A4 housed within the second hub. This, however, is not shown in the drawings.

As was mentioned previously, the planetary screw drives SD1-SD4 of the actuators A1-A4 are in accordance with the screw-threaded mechanism disclosed by Strandgren in U.S. Pat. No. 2,683,379. Strandgren describes the relationship that the threads of the planetary rollers must have with the threads of the inner and outer screw members so that the screw drives SD1-SD4 can drivingly interconnect the motors of the actuators to their casings. Therefore, no further description of this relationship need be provided herein.

One aspect and advantage of the present invention is that it utilizes a mechanism like that disclosed by Strandgren to provide an actuator that has a high mechanical advantage. As was explained earlier, the mechanism disclosed in Strandgren comprises inner and outer threaded screw members having a plurality of planetary rollers positioned between them. As was suggested in the various embodiments described above, either the inner or outer screw members may be driven by an electric motor for providing the desired transformation of a rotary motion to an axial motion. As an alternative, it is also possible that the rotor portions of the electrical motors could be connected to the carrier rings which secure the planetary rollers. Thus, the planetary rollers could be driven directly by the motor to produce rolling engagement of the rollers with the inner and outer screw members. This embodiment, however, was not shown in the drawings.

To provide a high mechanical advantage, the screw drives of the actuators described herein are constructed such that the casing of a particular actuator has a relatively small axial movement for each rotation of a particular ring member. The axial movement of the casing per ring member rotation can be calculated by using the following equation:

$$\text{Axial Movement/Rotation} = \left[ \text{Pitch } D1 + \text{Pitch } D2 \left( \frac{D1}{D2} \right) \right]$$

wherein Pitch D1=the pitch of the inner screw member; Pitch D2=the pitch of the planetary rollers; D1=the pitch diameter of the inner screw member; and D2=the pitch diameter of the planetary rollers.

By way of example only, an actuator A1 like that shown in FIG. 3 may have right hand single threaded planetary rollers with a pitch diameter of 5.0 millimeters and a pitch of 1.0 millimeters. The inner screw member (or rod member R1) may have a pitch diameter of 15.0 millimeters, and the threads of this member may be left handed with a 6.0 millimeter pitch. Applying the above equation yields the following result:

$$\text{Axial Movement/Rotation} = \left[ 6.0 + (-1.0) \left( \frac{15.0}{5.0} \right) \right]$$

$$= 3.0 \text{ millimeters}$$

Therefore, the casing C1 of the actuator would advance 3 millimeters for every rotation of ring member 48.

Another important aspect and advantage of the present invention is that the high mechanical advantage illustrated above can be achieved for large diameter actuators as well. Actuators A1, A2 in FIGS. 8–10, for example, may be large diameter actuators. As an illustration only, typical planetary rollers of actuator A2 may have pitch diameters of 0.75 inches, and a right hand single thread pitch of 0.125 inches. The inner screw member (or rod member R2) may have a pitch diameter of 36.0 inches, and the threads of this member may be left handed with a pitch of 6.125 inches. Applying the above equation yields:

$$\text{Axial Movement/Rotation} = \left[ 6.125 + (-0.125) \left( \frac{36.0}{0.75} \right) \right]$$

$$= 0.125 \text{ inches}$$

Thus, the casing C2 would advance 0.125 inches or approximately 3 millimeters for every rotation of ring member 124.

Large diameter actuators provide other advantages. One such advantage is that a large diameter actuator can be operated by a large diameter brushless electric motor, such as an electronically commutated Samarium Cobalt motor. This is advantageous in that such a motor can be driven at a low speed, but it can still provide a sufficiently high torque for powering the screw drive in an actuator. Low speed operation of the motor is important because it eliminates the need for gear reduction mechanisms in the actuator.

Another advantage provided by large diameter actuators is that they are well suited for efficient packaging in a propeller hub. For example, the concentric arrangement of actuators A1, A2 in FIG. 9 provides a very efficient means for packaging more than one actuator in a hub. A related advantage is that the large diameters of the actuators permit them to have hollow cylindrical openings for providing a passageway for the drive shaft D2. Therefore, large diameter actuators are ideally suited for use in a counter-rotating propeller arrangement.

The embodiments which have been described and illustrated herein are provided for the purpose of explaining the invention. None of the embodiments are to be used for the purpose of limiting the invention. Rather, the scope of the invention is to be determined solely by the appended claims interpreted in accordance with established doctrines of patent claim interpretation.

What is claimed is:

1. An adjustable pitch propeller, comprising:
   an axially elongated tubular hub having a center axis;
   a plurality of propeller blades mounted on said hub, each for rotation in position about a radial axis;
   an electromechanical linear actuator housed within said hub, said actuator having a longitudinal axis coinciding with the axis of the hub, said actuator including:
   a rod member which is fixed in position relative to said hub, a casing which is extendible and retractable axially relative to said rod member, a rotary electric motor within said casing, said motor including a rotor, and, planetary screw drive transmission means within said casing drivingly interconnecting said rotor and said casing, for causing said casing to move axially relative to said rod member in response to operation of said motor;
   mechanical drive means interconnecting said casing and said propellers, for causing the propellers to rotate in position in response to axial movement of said casing; and
   compression spring means for maintaining an axial loading on the planetary screw drive transmission means in an amount sufficient to prevent slippage within the planetary screw drive transmission.

2. An adjustable pitch propeller in accordance with claim 1, including a fixed support on an aircraft with said hub being mounted for rotation to said fixed support, and an electrical power transmission means for providing electricity to said electric motor to move said casing relative to said rod member, said power transmission means comprising:
   at least one rotor portion mounted to said hub and electrically connected to said motor;
   at least one stator portion mounted to said fixed support and electrically connected to an electrical power source, said rotor portion being adjacent said stator portion so that electricity for powering said motor is transmitted between said rotor and stator portions as said hub rotates.

3. An adjustable pitch propeller in accordance with claim 2, wherein said electrical power transmission means is in the form of at least one toroidal rotary transformer.

4. An adjustable pitch propeller in accordance with claim 2, wherein said electric motor comprises an electronically commutated brushless DC electric motor.

5. An adjustable pitch propeller in accordance with claim 4, wherein said electric motor comprises a Samarium Cobalt electric motor.

6. An apparatus for adjusting the pitch of a propeller, the apparatus being housed within a propeller hub that rotates about a center axis, said apparatus comprising:
   a generally cylindrical rod member;
   a generally tubular cylindrical casing, closely surrounding said rod member in concentric relationship therewith, with an annular-shaped cylindrical space being defined between an inner surface of said casing and an outer surface of said rod member;
   a planetary screw drive transmission means drivingly interconnecting said rod member and said casing, said planetary screw drive transmission means being positioned in said annular-shaped space; and
   an electric motor drive means drivingly connected to said planetary screw drive transmission means to cause said planetary screw drive transmission means to extend or retract said casing relative to said rod member, said motor drive means being positioned in said annular-shaped space, and wherein said rod member and casing are connected between said propeller and said hub so that extension or retraction of said casing relative to said rod member causes an adjustment in propeller pitch.

7. The apparatus of claim 6, wherein said planetary screw drive transmission means includes a cylindrical inner screw member, and a cylindrical outer screw member closely surrounding said inner screw member in concentric relationship therewith, and a plurality of planetary rollers positioned between said inner and outer screw members, and wherein said inner screw member comprises a ring member positioned in said annular-shaped space, and mounted to said outer surface of said rod member by bearing means for permitting rotation of said ring member about said rod member, said ring member including an externally threaded portion and carrier means for securing said planetary rollers adjacent said ring member threaded portion, said rollers having threads, and wherein said outer screw member comprises an internally threaded portion of said inner surface of said casing, with said roller threads engaging with the threads of both said ring member and said threaded portion of said casing, and with said electric motor drive means being connected to said ring member for driving said ring member in rotation about said rod member.

8. The apparatus of claim 7, wherein said electric motor drive means comprises an electronically commutated brushless electric motor having an annular rotor portion connected to said ring member, and having an annular stator portion mounted to said rod member outer surface adjacent said rotor portion, for driving said rotor portion relative to said stator portion to rotate said ring member about said rod member.

9. The apparatus of claim 8, wherein said rod member is a hollow tubular member, and including a second planetary screw drive transmission means received within said rod member and drivingly interconnecting said hub with an inner surface of said rod member, said second screw drive transmission means having a cylindrical inner screw member, a cylindrical outer screw member closely surrounding said inner screw member in concentric relationship therewith, and a plurality of planetary rollers positioned between such inner screw member and such outer screw member, with a second annular-shaped cylindrical space being defined between an outer surface of such inner screw member and said inner surface of said rod member, and wherein said outer screw member of said second screw drive transmission means comprises a ring member, positioned in said second annular-shaped space, and mounted to said inside surface of said rod member by bearing means for permitting rotation of such ring member within the rod member, such ring member including an internally threaded portion and carrier means for securing the planetary rollers of said second screw drive transmission means to such ring member threaded portion, such rollers having threads which engage with both the threaded portion of said ring member and a threaded portion of the inner screw member of the second drive means, and including a second electric motor drive means positioned in said second annular-shaped space and drivingly connected to said second planetary screw drive transmission means to cause said second screw drive transmission means to move said rod member and said casing axially within said hub relative to said inner screw member of said second screw drive transmission means, to cause the pitch of said propeller to change.

10. The apparatus of claim 9, wherein said second electric motor drive means comprises an electronically commutated brushless electric motor having an annular rotor portion connected to said ring member of said second planetary screw drive transmission means, with said second motor further including a stator portion mounted to said inner surface of said rod member, said stator portion of said second motor being adjacent said rotor portion of said second motor for driving such rotor portion.

11. The apparatus of claim 10, including another propeller hub connected to a drive shaft for driving said other hub in rotation about said center axis, and wherein said inner screw member of said second planetary screw drive transmission means is a hollow tubular member in concentric relationship with both said rod member and said casing, and wherein said drive shaft extends along said center axis through a passageway in said inner screw member of said second screw drive transmission means.

12. The apparatus of claim 6, wherein said planetary screw drive transmission means includes a cylindrical inner screw member, and a cylindrical outer screw member closely surrounding said inner screw member in concentric relationship therewith, and a plurality of planetary rollers positioned between said inner and outer screw members, and wherein said outer screw member comprises a ring member positioned in said annular-shaped space and mounted to said inner surface of said casing by bearing means for permitting rotation of said ring member within said casing, said ring member including an internally threaded portion and carrier means for securing said planetary rollers adjacent said ring member threaded portion, said rollers having threads, and wherein said inner screw member comprises an externally threaded portion of said outer surface of said rod member, with said roller threads engaging with the threads of both said ring member and said threaded portion of said rod member, and with said electric motor drive means being connected to said ring member for driving said ring member in rotation.

13. The apparatus of claim 12, wherein said electric motor drive means comprises an electronically commutated brushless electric motor having an annular rotor portion connected to said ring member, and having an annular stator portion mounted to said casing inner surface adjacent said rotor portion, for driving said rotor portion relative to said stator portion to rotate said ring member.

14. The apparatus of claim 13, wherein said ring member is a tubular member having a first end connected to said casing inner surface by a first bearing, and having a second end connected to said casing inner surface by a second bearing, said ring member having a first axially extending annular portion and a second axially extending annular portion, wherein said first portion includes said internally threaded portion of said ring member, and wherein said second portion is connected to said rotor portion of said motor, and wherein the radius of said first portion is greater than the radius of said second portion.

15. The apparatus of claim 16, wherein said rod member outer surface includes at least one axially extending spline, and including a guide member connected to said casing, said guide member having a portion shaped for sliding engagement with said spline, such portion of said guide member cooperating with said spline to permit said casing to move axially relative to said rod member but preventing rotation of said rod member and said casing relative to each other.

16. The apparatus of claim 15, including at least one axially extending spline positioned on an outer surface of said casing, and a second guide member connected to said propeller hub, said second guide member having a portion shaped for sliding engagement with said spline on said outer surface of said casing, said casing spline and said second guide member portion cooperating to permit said casing to move axially relative to said hub but preventing rotation of said casing relative to said hub.

17. The apparatus of claim 16, including compression spring means connected between said hub and said planetary screw drive transmission means, for applying an axial loading on said planetary screw drive transmission means.

18. The apparatus of claim 6, including compression spring means connected between said hub and said planetary screw drive transmission means, for applying an axial loading on said planetary screw drive transmission means.

19. The apparatus of claim 7, wherein the pitch diameter of said inner screw member is relatively large in comparison to the pitch diameter of said planetary rollers.

20. The apparatus of claim 9, including compression spring means connected between said hub and said second planetary screw drive transmission means, for applying an axial loading on said second planetary screw drive transmission means.

21. The apparatus of claim 10, wherein said ring member of said first planetary screw drive transmission means is a tubular member having a first end connected to said rod member outer surface by a first bearing, and having a second end connected to said rod member outer surface by a second bearing, such ring member having a first axially extending annular portion and a second axially extending annular portion, wherein said first portion is connected to said rotor portion of said motor of said first planetary screw drive transmission means, and wherein said second portion includes said externally threaded portion of such ring member, and wherein the radius of said first portion is greater than the radius of said second portion.

22. The apparatus of claim 21, wherein said ring member of said second planetary screw drive transmission means is a tubular member having a first end connected to said inner surface of said rod member by a bearing, and having a second end connected to said rod member inner surface by another bearing, such ring member having a first axially extending annular portion and a second axially extending annular portion, such first portion including the internally threaded portion of such ring member, and such second portion being connected to said rotor portion of said motor which drives said second planetary screw drive transmission means, and wherein the radius of such first portion is greater than the radius of such second portion.

23. The apparatus of claim 22, including at least one axially extending spline positioned on said inner surface of said casing, and including at least one axially extending spline positioned on the outer surface of said inner screw member of said second planetary screw drive transmission means, and including a guide member connected to said rod member, said guide member having a first portion shaped for sliding engagement with said spline on said inner surface of said casing, and said guide member having a second portion shaped for sliding engagement with said spline on said outer surface of said inner screw member of said second planetary screw drive transmission means, said guide member cooperating with said splines to permit axial movement of said casing, said rod member, and said inner screw member of said second planetary screw drive transmission means within said hub, while preventing rotation of said casing, said rod member and such inner screw member relative to each other.

24. An electromechanical actuator connected between a support and a member to be moved relative to said support, said actuator comprising:
a generally cylindrical rod member;
a generally tubular cylindrical casing, closely surrounding said rod member in concentric relationship therewith, with an annular-shaped cylindrical space being defined between an inner surface of said casing and an outer surface of said rod member;
a planetary screw drive transmission means drivingly connecting said rod member and said casing, said planetary screw drive transmission means being positioned in said annular-shaped space;
an electric motor drive means drivingly connected to said planetary screw drive transmission means to cause said planetary screw drive transmission means to extend or retract said casing relative to said rod member, said motor drive means being positioned in said annular-shaped space, and wherein said rod member and casing are connected between said support and said member to be moved in a manner so that extension or retraction of said casing relative to said rod member causes movement of said member; and
compression spring means for applying an axial loading on said planetary screw drive transmission means.

25. The actuator of claim 24, wherein said planetary screw drive transmission means includes a cylindrical inner screw member, and a cylindrical outer screw member closely surrounding said inner screw member in concentric relationship therewith, and a plurality of planetary rollers positioned between said inner and outer screw members, and wherein said outer screw member comprises a ring member positioned in said annular-shaped space and mounted to said inner surface of said casing by bearing means for permitting rotation of said ring member within said casing, said ring member including an internally threaded portion and carrier means for securing said planetary rollers adjacent said ring member threaded portion, said rollers having threads, and wherein said inner screw member comprises an externally threaded portion of said outer surface of said rod member, with said roller threads engaging with the threads of both said ring member and said threaded portion of said rod member, and with said electric motor drive means being connected to said ring member for driving said ring member in rotation.

26. The actuator of claim 25, wherein said electric drive motor means comprises an electronically commutated brushless electric motor having an annular rotor portion connected to said ring member, and having an annular stator portion mounted to said casing inner surface adjacent said rotor portion, for driving said rotor portion relative to said stator portion to rotate said ring member.

27. The actuator of claim 26, wherein said ring member is a tubular member having a first end connected to said casing inner surface by a first bearing, and having a second end connected to said casing inner surface by a second bearing, said ring member having a first axially extending annular portion and a second axially extending annular portion, wherein said first portion includes said internally threaded portion of said ring member, and wherein said second portion is connected to said rotor portion of said motor, and wherein the radius of said first portion is greater than the radius of said second portion.

28. The actuator of claim 24, wherein said planetary screw drive transmission means includes a cylindrical inner screw member, and a cylindrical outer screw member closely surrounding said inner screw member in concentric relationship therewith, and a plurality of planetary rollers positioned between said inner and outer screw members, and wherein said inner screw member comprises a ring member positioned in said annular-shaped space, and mounted to said outer surface of said rod member by bearing means for permitting rotation of said ring member about said rod member, said ring member including an externally threaded portion and carrier means for securing said planetary rollers adjacent said ring member threaded portion, said rollers having threads, and wherein said outer screw member comprises an internally threaded portion of said inner surface of said casing, with said roller threads engaging with the threads of both said ring member and said threaded portion of said casing, and with said electric motor drive means being connected to said ring member for driving said ring member in rotation.

29. The actuator of claim 28, wherein said electric motor drive means comprises an electronically commutated brushless electric motor having an annular rotor portion connected to said ring member, and having an annular stator portion mounted to said rod member outer surface adjacent said rotor portion, for driving said rotor portion relative to said stator portion to rotate said ring member about said rod memer.

30. The actuator of claim 29, wherein said ring member is a tubular member having a first end connected to said rod member outer surface by a first bearing, and having a second end connected to said rotor member outer surface by a second bearing, said ring member having a first axially extending annular portion and a second axially extending annular portion, wherein said first portion is connected to said rotor portion of said motor, and wherein said second portion includes said externally threaded portion of said ring member, and wherein the radius of said first portion is greater than the radius of said second portion.

* * * * *

UNITED STATES PATENT AND TRADEMARK OFFICE
CERTIFICATE OF CORRECTION

PATENT NO. : 4,591,313
DATED : May 27, 1986
INVENTOR(S) : Henry J. Miyatake et al.

It is certified that error appears in the above-identified patent and that said Letters Patent are hereby corrected as shown below:

Column 2, line 32, "numberals" should be -- numerals --.
Column 2, line 61, "and shown" should be -- showing --.
Column 3, line 27, "extendable" should be -- extendible --.
Column 3, line 27, "retractible" should be -- retractable --.
Column 7, line 37, "offcenter" should be -- off center --.
Column 7, line 65, "of" should be -- to --.
Claim 15, column 18, line 26, "16" should be -- 14 --.
Claim 29, column 21, line 5, "memer" should be -- member --.

Signed and Sealed this

Ninth Day of September 1986

[SEAL]

Attest:

DONALD J. QUIGG

Attesting Officer

Commissioner of Patents and Trademarks